United States Patent [19]

Gardam

[11] Patent Number: 4,688,902
[45] Date of Patent: Aug. 25, 1987

[54] ANTI-BACKLASH CAM

[75] Inventor: Allan Gardam, North Wales, United Kingdom

[73] Assignee: Pilkington P.E. Limited, United Kingdom

[21] Appl. No.: 799,446

[22] Filed: Nov. 19, 1985

[30] Foreign Application Priority Data

Nov. 30, 1984 [GB] United Kingdom ............. 8430343

[51] Int. Cl.$^4$ .............................................. G02B 7/04
[52] U.S. Cl. ..................................... 350/429; 350/255
[58] Field of Search ............... 350/429, 430, 255, 247

[56] References Cited

U.S. PATENT DOCUMENTS

| 4,322,151 | 3/1982 | Weiss ................................. | 350/429 |
| 4,533,218 | 8/1985 | Nakazato et al. ................... | 350/430 |
| 4,548,471 | 10/1985 | Schlapp et al. ..................... | 350/429 |

FOREIGN PATENT DOCUMENTS

| 0112805 | 12/1983 | European Pat. Off. . |
| WO82/03889 | 4/1982 | PCT Int'l Appl. . |
| 254261 | 3/1926 | United Kingdom . |
| 1112917 | 11/1965 | United Kingdom . |
| 1458779 | 4/1975 | United Kingdom . |
| 1320861 | 1/1977 | United Kingdom . |
| 1575725 | 4/1977 | United Kingdom . |

Primary Examiner—John K. Corbin
Assistant Examiner—Loha Ben
Attorney, Agent, or Firm—F. Eugene Davis, IV; Mark P. Stone

[57] ABSTRACT

A zoom lens cam mechanism has two cam follower bearings mounted on a common shaft and arranged so that they engage against and roll on opposite sides of a cam groove or slot so as to reduce backlash.

12 Claims, 7 Drawing Figures

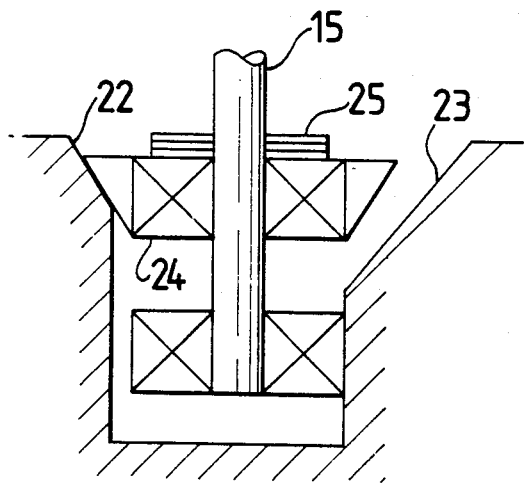
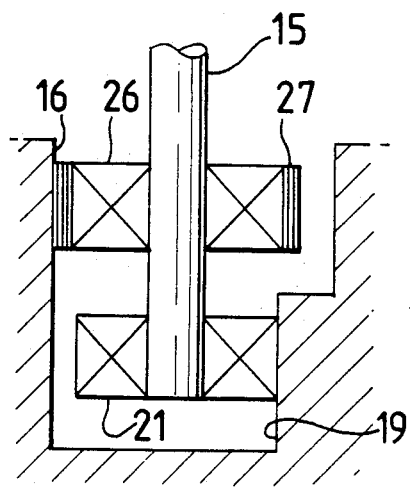
FIG.4.  FIG.5.
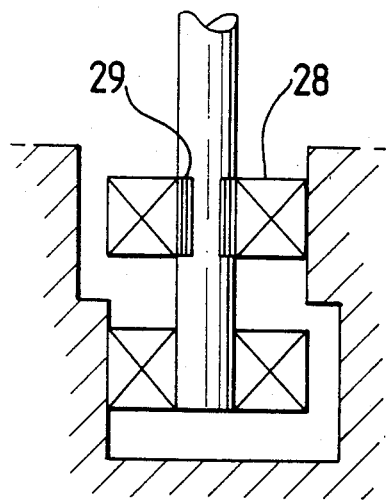
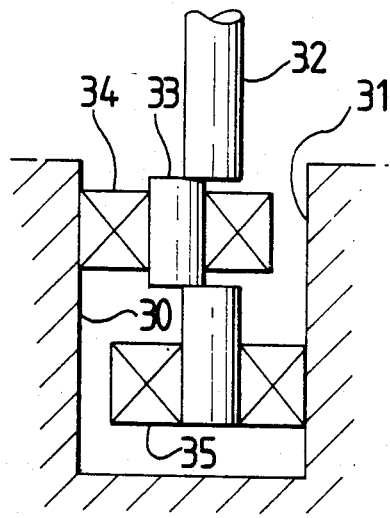
FIG.6.  FIG.7.

ANTI-BACKLASH CAM

BACKGROUND OF THE INVENTION

This invention concerns improvements in or relating to cam mechanisms and relates more particularly to cam mechanisms which produce controlled linear motion from rotary motion.

Such mechanisms are used in lenses, and especially zoom lenses, where a lens element or group of lens elements is required to move axially responsively to angular movement of a rotatable member such as a focussing ring. In a zoom lens of the mechanically compensated type at least two lens elements or groups are required to move relatively to each other and relatively to fixed elements of the lens system in a particular manner. Such movements can be effected and controlled by use of suitable cams and cam followers. The cam is frequently provided by a ring with a groove or slot of basically helical (sometimes called spiral) form but with its curve adapted to provide the required movement, and is known as a scroll cam. The cam follower runs in the groove or slot so that relative rotation of the ring produces the required axial movement of the follower and hence of the lens element or group connected to the follower. Commonly the cam follower is a pin or the like which slides along the groove or slot but this can give rise to undesirably high friction. If low friction is required then precision bearings such as rollers can be used for the cam followers. However, this can give rise to problems of looseness and can make the system susceptible to backlash because the cam groove or slot must be wider than the diameter of the bearing or the follower will be unable to roll. As a practical matter, therefore, very tight tolerances have to be imposed, particularly on the width of the cam groove or slot, but even then some backlash can still occur.

Some prior proposals of cam mechanisms for zoom lenses are described in British Patent No. 1,066,502 which discloses a roller in a cam groove or slot, U.S. Pat. No. 4,386,829 which discloses a cam protuberance arrangement, and U.S. Pat. No. 4,465,344 which discloses a sliding cam follower.

SUMMARY OF THE INVENTION

According to the present invention there is provided a cam mechanism for effecting controlled movement comprising a cam member having a cam groove or slot and a cam follower having two bearings arranged so that the bearings engage against and roll on respective opposite sides of the groove or slot.

Preferably the two bearings are mounted on a common shaft and the groove or slot has a cross-sectional shape such that the bearings engage respective opposite sides. For example the groove or slot may have stepped walls on both sides to accommodate two bearings of the same diameter, or may have a stepped wall on one side only and accommodate bearings of different respective diameters. If desired the groove or slot walls may have an angled or chamferred part for engagement by a correspondingly angled bearing periphery. Alternatively, the groove or slot may have plain walls and one bearing may be eccentrically mounted with respect to the other, e.g. on an eccentric portion of the shaft.

Preferably one of the bearings has a resilient part, which may be an inner or outer tire, so as to urge the bearings into and maintain them in contact with the respective slot sides. Preferably the groove or slot has an enlarged end opening.

A scroll cam mechanism in accordance with the invention is especially suitable for moving a lens element or lens group in an optical lens, and the invention further provides a lens, and especially a zoom lens which may be the mechanically compensated type, incorporating such a scroll cam mechanism.

BRIEF DESCRIPTION OF THE DRAWING

Apparatus in accordance with the invention will now be described, by way of example, with reference to the accompanying drawings, in which:

FIGS. 2 to 7 are schematic cross-sectional views through part of the cam mechanism illustrating alternative cam and cam follower arrangements.

DESCRIPTION OF THE PREFERRED EMBODIMENTS

Figure 1:
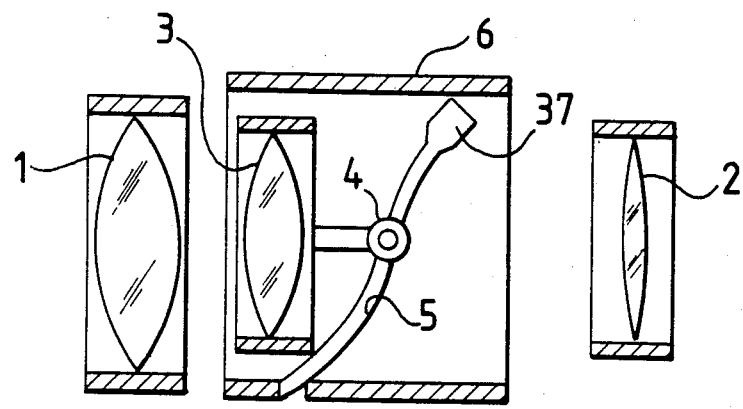
FIG. 1 is a schematic representation of a zoom lens having a cam mechanism.

FIG. 1 shows, purely schematically, a zoom lens having a fixed front lens element 1, a fixed rear lens element 2, and an axially movable middle lens element 3 which is effectively connected with a cam follower 4 running in the groove or slot 5 of a scroll cam ring 6. It will be understood that in practice the zoom lens will generally comprise a greater number of lens elements with associated relatively complex mountings, and that with a mechanically compensated zoom lens requiring controlled different axial movement of two or more lens elements or groups a corresponding number of cam grooves or slots and cam followers are provided. The detailed construction of zoom lenses is within the knowledge of those skilled in the art and unnecessary to describe here. FIG. 1, therefore, simply illustrates the well known manner of moving a lens element 3 axially by rotating the cam ring 6 relatively to the cam follower 4, the latter being constrained to move in a direction parallel to the lens axis at a speed dictated by the curved form of the groove or slot 5 in which it is accommodated.

For convenience the groove or slot 5 is referred to from here on as a slot, but it will be understood that it may take the form of a groove.

Figure 2:
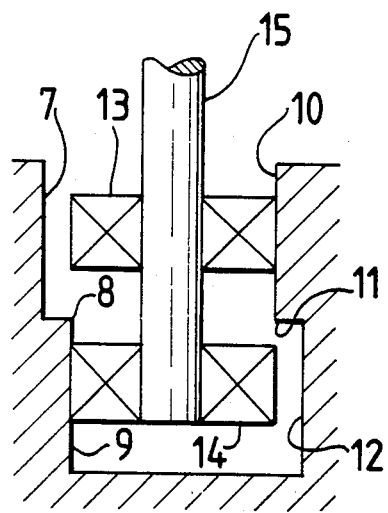

FIG. 2 is a cross-section of the cam slot 5 and the cam follower 4 in an arrangement in accordance with the invention. The slot is defined between opposed parallel but stepped walls. Specifically the left wall has an upper part 7 set back by a step 8 from its lower part 9. The right wall has an upper part 10 set forward by a step 11 from its lower part 12. The slot width is the same for the lower and upper parts, i.e. the spacing between the opposed upper wall parts 7 and 10 is the same as that between the lower wall parts 9 and 12. The cam follower comprises upper and lower roller bearings 13 and 14 mounted and free to rotate on a common straight shaft 15. The upper and lower bearings are of the same diameter and the upper bearing 13 engages against and rolls on the upper part 10 of the right wall while the lower bearing 14 engages against and rolls on the lower part 9 of the left wall. The bearings thus engage against and roll on respective opposite sides of the slot. This provides a low friction arrangement which substantially eliminates backlash.

Figure 3:
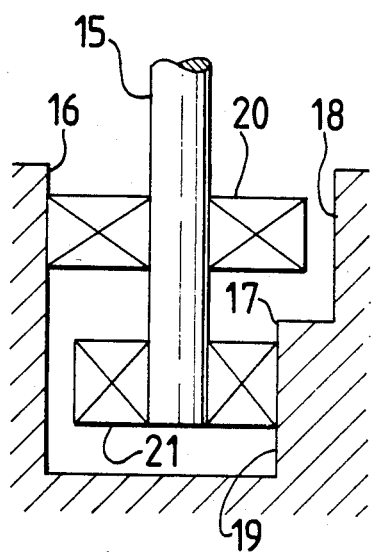

In the arrangement of FIG. 3 the left wall 16 of the slot is plain (i.e. unstepped) but the right wall has a step 17 between a set back upper part 18 and a lower part 19.

The upper roller bearing 20 is of greater diameter than the lower roller bearing 21. The upper bearing 20 rolls against the left wall 16 and the lower bearing 21 runs against the lower part 19 of the right wall. The slot shape of FIG. 3 can be easier to machine than that of FIG. 2 since undercutting as at the step 11 is not needed.

Another slot shape which also avoids the need for such undercutting is shown in FIG. 4. Here the upper part of the slot has a chamfer to provide angled upper wall parts 22 and 23. The upper bearing 24 has a correspondingly angled periphery which engages against and rolls on the left upper wall part 22. Such engagement is maintained by the action of a spring or spring washer 25 which urges the upper bearing (downwardly as shown in FIG. 4) against the angled race 22.

The provision of a resilient part for one of the bearings can be helpful in maintaining the required contact with opposite sides of the slot even if there is some small variational error in the slot width. The allowable tolerances for the slot width can therefore be significantly increased. FIG. 5 shows an arrangement with a slot shape similar to that of FIG. 3 but with the upper roller bearing 26 having an outer rubber tire 27. The actual roller of the bearing 26 has the same diameter as the lower bearing, and the tire 27 engages against the left wall 16. During such engagement the tyre deforms and its resilience urges the lower bearing 21 against the right wall lower part 19.

FIG. 6 shows an arrangement similar to FIG. 2 but the upper bearing 28 has a rubber inner tire 29 whose resilience maintains the required contact with opposite sides of the slot despite small changes in slot width.

In the arrangements of FIGS. 2 to 6 the upper and lower bearings are mounted on a straight shaft 15 so as to be freely rotatable about a common axis and the cam slot is shaped in cross-section to accommodate the bearings in a manner such that they engage opposite sides. FIG. 7 shows an alternative arrangement in which the slot has plain (i.e. unstepped) parallel walls 30 and 31 and the bearings are freely rotatable about displaced axes. Specifically, the shaft 32 has an eccentric portion 33 which carries the upper bearing 34. The upper bearing is thus eccentrically mounted with respect to the lower bearing 35 so that the upper bearing engages against and rolls on the left wall 30 while the lower bearing engages against and rolls on the right wall 31. It will be appreciated that again one of the bearings may be provided with a resilient tire, and of course it could be the lower bearing which is eccentric instead of the upper one with the shaft shaped accordingly, i.e. having an eccentric end portion. While the FIG. 7 arrangement has a simple cam slot shape which can be machined by a single cut, it has relative disadvantages when the cam form involves rapidly changing curves.

Preferably, as schematically shown in FIG. 1, the groove or slot 5 has an enlarged end opening 37. Such opening of enlarged area at the end of the cam track can facilitate assembly of the mechanism by permitting initial entry of the bearings into the groove or slot through the enlarged end opening, and can also be advantageous in arrangements having a resilient part in a bearing by providing a resting place for the bearing when the device is not in use thereby avoiding unwanted retained deformation of the resilient part which might otherwise occur if the bearing were pressed against the wall at a location along the track for a prolonged storage period.

It will be appreciated that the specific arrangements shown and described are given by way of example and that other arrangements, possibly involving different combinations of features present in the specifically described arrangements, may be devised.

As previously indicated, a zoom lens of the mechanically compensated type may have two cam tracks with bearings arranged in accordance with the invention. One track may be such as to provide a linear movement with respect to rotation of the cam ring and the other a non-linear movement so as to achieve the required relative movement between the zoom elements, or both tracks may provide non-linear movements, for example so that the net result is to produce a constant fractional change in image height for a given constant speed zooming time.

It will be seen that an optimum arrangement in accordance with the invention can provide a simple and compact cam mechanism with low friction and zero or minimal backlash which is capable of dealing with steep cam curves, and which need not suffer from differential expansion problems and has readily attainable manufacturing tolerances. It will further be understood that, although especially suited to zoom lenses, the mechanism may find other applications.

I claim:

1. An optical lens incorporating a scroll cam mechanism for effecting controlled movement of a lens element, said cam mechanism comprising a cam member having a cam groove or slot and a cam follower having two bearings mounted on a common shaft and arranged so that the bearings engage against and roll on respective opposite sides of the groove or slot.

2. A lens according to claim 1 in which the groove or slot has an asymmetric cross-sectional shape such that the bearings engage respective opposite sides.

3. A lens according to claim 2 in which the groove or slot has stepped walls on both sides to accommodate two bearings of the same diameter.

4. A lens according to claim 2 in which the groove or slot has a stepped wall on one side only to accommodate bearings of different respective diameters.

5. A lens according to claim 2 in which the groove or slot walls have an angled part for engagement by a corresponding angled bearing periphery.

6. A lens according to claim 1 in which the groove or slot has plain walls and one bearing is eccentrically mounted with respect to the other.

7. A lens according to claim 6 in which said one bearing is mounted on an eccentric shaft portion.

8. A lens according to claim 1 in which one of the bearings has a resilient part.

9. A lens according to claim 8 in which said resilient part is an inner or outer tire.

10. A lens according to claim 1 in which the groove or slot has an enlarged end opening.

11. A lens according to claim 1 incorporated into a zoom lens.

12. A mechanically compensated zoom lens according to claim 11.

* * * * *